(12) United States Patent
Yeh

(10) Patent No.: US 6,393,165 B1
(45) Date of Patent: May 21, 2002

(54) TOUCH PAD MODULE FOR CONTROLLING A CURSOR

(75) Inventor: Yun-Chen Yeh, Tao-Yuan Hsien (TW)

(73) Assignee: Quanta Computer Inc., Tao-Yuan Hsien (TW)

( * ) Notice: Subject to any disclaimer, the term of this patent is extended or adjusted under 35 U.S.C. 154(b) by 0 days.

(21) Appl. No.: 09/226,976

(22) Filed: Jan. 8, 1999

(30) Foreign Application Priority Data

May 7, 1998 (TW) ........................................ 87207087 U

(51) Int. Cl.[7] ............................. G06K 9/00; G09G 5/00; G09G 5/08

(52) U.S. Cl. ..................... 382/325; 345/173; 345/157

(58) Field of Search ................................ 382/325, 315; 345/173, 157, 158, 163, 156; 200/5 A, 341

(56) References Cited

U.S. PATENT DOCUMENTS 4,314,117 A * 2/1982 Ditzig .......................... 200/5 A
4,503,294 A * 3/1985 Matsumaru ................... 200/5 A
4,613,736 A * 9/1986 Shichijo et al. .............. 200/317

* cited by examiner

Primary Examiner—Wenpeng Chen
(74) Attorney, Agent, or Firm—Fish & Richardson P.C.

(57) ABSTRACT

A touch pad module for controlling the movement of a cursor includes a plate, two resilient arms coplanar with the plate, each of the resilient arms having a free end part opposite to an end formed integrally with the plate, each of the resilient arms being bendable to permit the free end part to resiliently move away from the plane of the plate, a touch control region formed at a front side of said plate, a control circuit unit disposed opposite to the touch control region at a rear side of the plate, and a switching unit provided on a rear side of each of the resilient arms and electrically connected to the control circuit unit. The switching unit has a movable contact member projecting resiliently from the rear side of the corresponding one of the resilient arms.

4 Claims, 4 Drawing Sheets

TOUCH PAD MODULE FOR CONTROLLING A CURSOR

BACKGROUND OF THE INVENTION

1. Field of the Invention

The invention relates to a touch pad for controlling the movement of a cursor on a visual display, more particularly to a touch pad module mountable on a notebook computer.

2. Description of the Related Art

For miniaturization of computer products, touch pads that perform the same function as a mouse device, have been developed to control the movement of a cursor in a visual display. As touch pads have a reduced size, they are advantageously used in notebook computers by mounting on a keyboard panel. As shown in FIGS. 1 and 2, a typical cursor control device comprises a touch pad body 1, a touch control region 2 with a sensing film 2a formed on a front side of the touch pad body 1, a control circuit 2b provided on a back side of the touch pad body 1, and a contact switch unit 3 electrically connected to the control circuit 2b by means of a flexible printed circuit member 4, such as a ribbon cable. The contact switch unit 3 is provided with a push button 3a and a movable contact unit 3b. Such a control device is not a unitary construction and thus tends to encounter problems in governing inventory. In addition, the manufacturing cost of such a control device is high due to the use of expensive ribbon cables. Moreover, the push button 3a raised from the touch pad body 1 occupies a certain height and is not advantageous for miniaturization.

Another conventional cursor control device is shown in FIGS. 3 and 4, wherein a contact switch unit 3' is directly mounted on a touch pad body 1' which has a touch control region 2' covered by a sensing film 2a' and a control circuit unit 2b'. The contact switch 3' has a push button 3a', a movable contact unit 3b' loaded with a spring 3c', and a stationary contact member 3d' disposed on the touch pad body 1'. The stationary contact member 3d' is electrically connected to the control circuit unit 2b via printed circuit lines. This type of control device has a unitary construction and dispenses with the use of the ribbon cables. However, since it still utilizes the push button 3a', the size thereof cannot be reduced satisfactorily. In addition, as the contact switch unit 3' and the control circuit unit 2b' are provided respectively at the front and back sides of the touch pad body 1', soldering has to be carried out in two successive steps at two sides of the touch pad body 1' and therefore is thus laborious.

SUMMARY OF THE INVENTION

The main object of the present invention is to provide a unitary touch pad module which can overcome the above-mentioned disadvantages.

According to the present invention, a touch pad module for controlling the movement of a cursor comprises: a plate; two resilient arms coplanar with the plate, each of the resilient arms having one end formed integrally with the plate and a free end part opposite to the one end, each of the resilient arms being bendable to permit the free end part to resiliently move away from the plane of the plate; a touch control region formed at a front side of the plate; a control circuit unit disposed opposite to the touch control region at a rear side of the plate; and a switching unit provided on a rear side of each of the resilient arms and electrically connected to the control circuit unit, the switching unit having a movable contact member projecting resiliently from the rear side of the corresponding one of the resilient arms.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
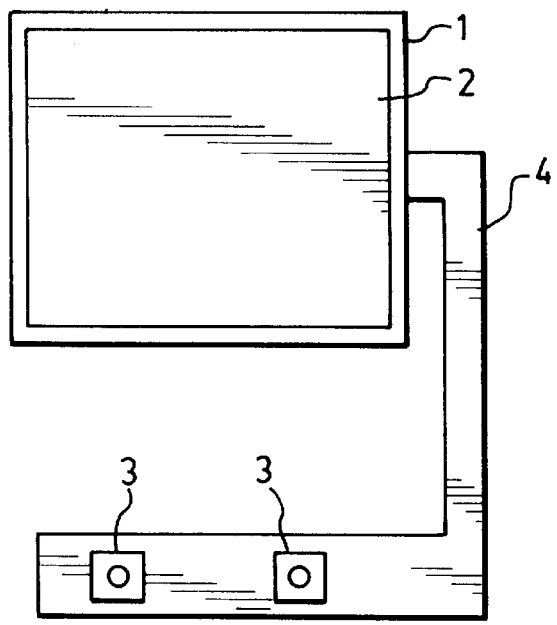
FIG. 1 is a schematic front view which illustrates a conventional control device for control of a cursor.
Figure 2:
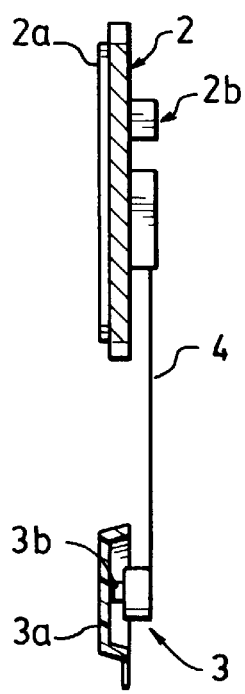
FIG. 2 is a side elevation view of the conventional control device of FIG. 1.
Figure 3:
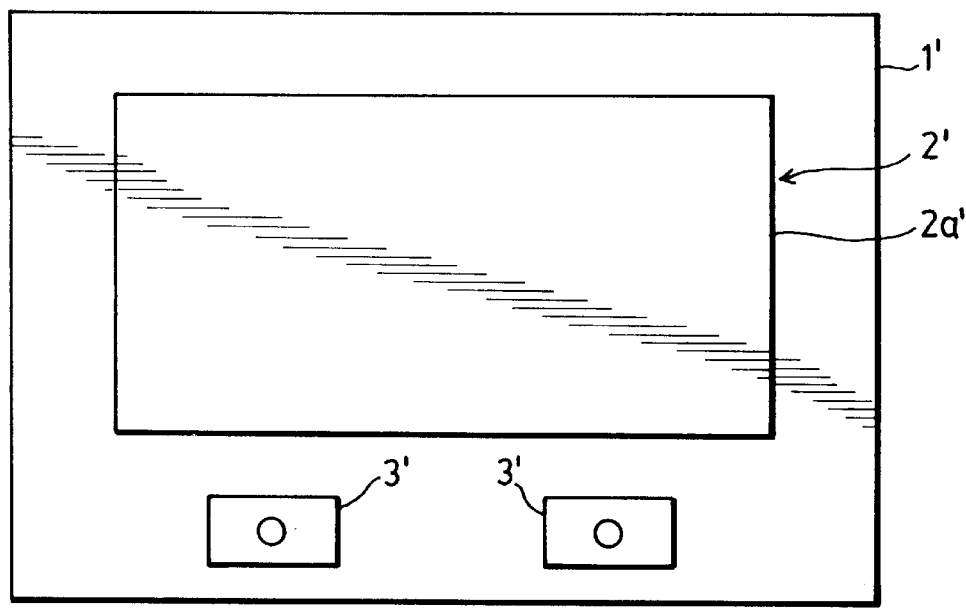
FIG. 3 is a schematic front view which illustrates another conventional control device.
Figure 4:
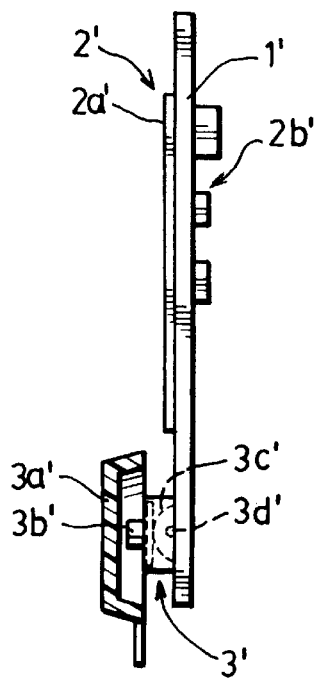
FIG. 4 is a side elevation view of the control device of FIG. 3.
Figure 5:
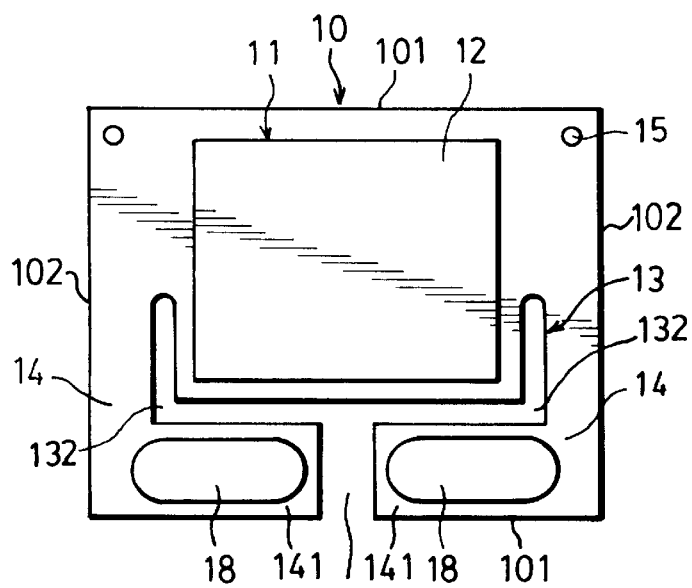
FIG. 5 is a schematic front view of a touch pad module embodying the present invention.
Figure 6:
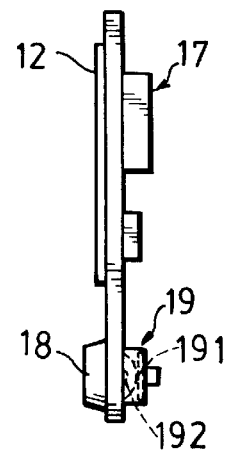
FIG. 6 is a schematic side elevation view of the touch pad module of FIG. 5.
Figure 7:
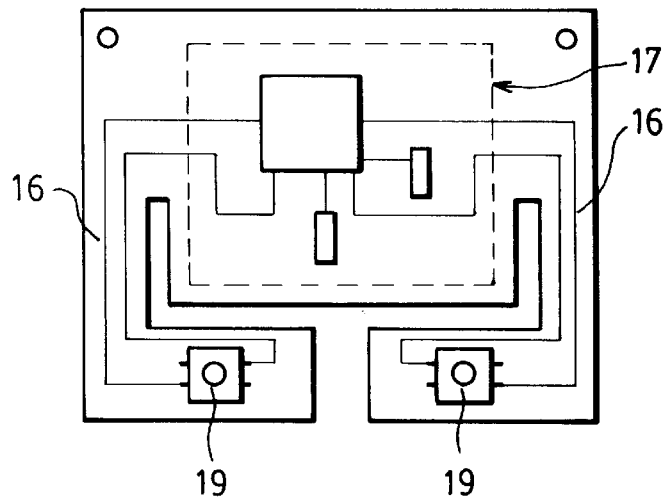
FIG. 7 is a schematic rear view of the touch pad module of FIG. 5.

Referring to FIGS. 5, 6 and 7, an embodiment of a touch pad module according to the present invention is shown to include a plate 10 made of a plastic material and having four peripheral sides 101, 102. The plate 10 has two mounting holes 15 at two corners thereof. A central portion at the front side of the plate 10 is provided with a touch control region 11 covered by a sensing film 12. A control circuit unit 17 is disposed on the rear side of the plate 10 opposite to the touch control region 11. The plate 10 further has slit means 13 which includes a first slit section 131 and two second slit sections 132 at the outside of the touch control region 11, thereby splitting the plate 10 and forming two resilient arms 14.

The first slit section 131 opens at one of the peripheral sides 101 of the plate 11 and extends inwardly from the peripheral side 101. The second slit sections 132 extend in opposite directions from the first slit section 131 in parallel to the peripheral side 101 and then turn along the directions parallel to two opposing peripheral sides 102. Each resilient arm 14 is integrally connected to the plate 10 and has a free end part 141 which is bendable resiliently to turn away from the plane of the plate 10.

The sensing film 12, the touch control region 11 and the control circuit unit 17 are conventional and the details thereof are omitted herein for the sake of brevity.

Decorative pieces 18 are provided on front sides of the resilient arms 14, whereas the rear sides of the resilient arms 14 are respectively provided with switching units 19 which are electrically connected to the control circuit unit 17 via circuit traces 16. Each switching unit 19 has a movable contact member 191 projecting resiliently from the rear side thereof, and a stationary contact member 192 to contact the movable contact member 191 when the movable contact member 191 is pressed.

The plate 10 can be assembled on a notebook computer (not shown) by mounting on a keyboard panel of the latter via screws (not shown) and mounting holes 15 in the plate 10 and by electrically connecting the control circuit unit 17 to a main circuit board of the notebook computer.

In operation, the user may place a finger on one of the decorative pieces 18 to push the corresponding resilient arm 14. As the resilient arm 14 is pressed, the corresponding switching unit 19 is compressed between the resilient arm 14 and the surface of the keyboard panel, thereby pushing the movable contact member 191 toward the fixed contact member 192. As a result, a signal is sent from the switching unit 19 to the control circuit unit 17. When the user's finger is removed from the resilient arm 14, the resilient arm 14 returns to its original position in which the resilient arms 14 are coplanar with the plate 10.

As mentioned above, the switching units 19 are disposed on the plate 10 at the same side (i.e. the rear side) as the control circuit unit 17 and are connected to the control circuit 17 via the circuit traces 16. With such an arrangement, soldering can be carried out via a one-step operation at the rear side of the plate 10. In addition, the resilient arms 14 are used in place of the push buttons of the conventional devices shown FIGS. 1 to 4 and are formed unitarily with the plate 10 as a one-piece construction. Thus, the size of the touch pad module is satisfactorily reduced.

Although the plate 10 is configured to have the slit means 13, as shown in FIGS. 5–7, so as to form the resilient arms 14, the configuration of the plate 10 is not limited thereto according to the present invention. The plate 10 may be configured to have other forms of the slit means and the resilient arms as shown in FIGS. 8 and 9.

Figure 8:
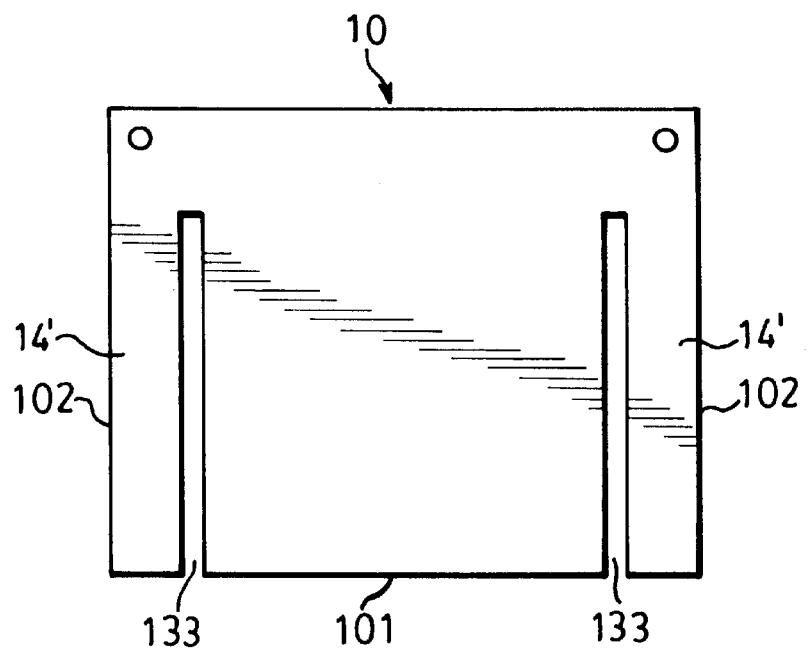
FIG. 8 is a schematic view that illustrates another configuration of a plate usable in the touch pad module of the present invention.

In FIG. 8, the plate 10 is provided with two resilient arms 14' by forming a pair of parallel first slit sections 133 which open at one peripheral side 101 of the plate 10 and which extend adjacent and parallel to two opposing peripheral sides 102 of the plate 10.

Figure 9:
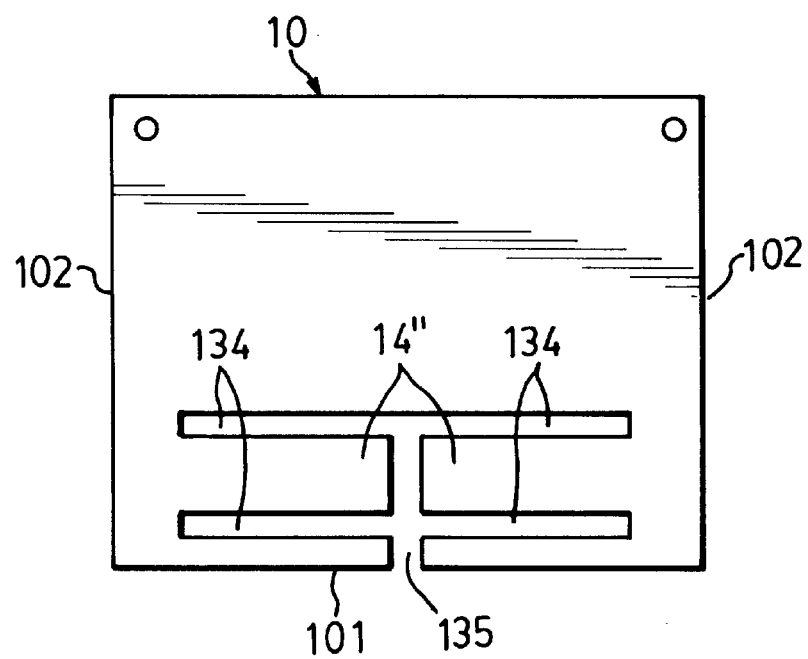
FIG. 9 is a schematic view that illustrates a further configuration of the plate usable in the touch pad module of the present invention.

In FIG. 9, the plate 10 is provided with two resilient arms 14" by forming a first slit section 135 opening at the peripheral side 101 of the plate 10 and two pairs of second slit sections 134 which extend in opposite directions from the first slit section 135 parallel to the peripheral sides 102 of the plate 10.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What I claim is:

1. A touch pad module for controlling the movement of a cursor, comprising:
    a plate;
    two resilient arms which are formed from one piece with said plate, each of said resilient arms having one end formed integrally with said plate and a free end part opposite to said one end, each of said resilient arms being bendable to permit said free end part to resiliently move away from the plane of said plate;
    a touch control region formed at a front side of said plate;
    a control circuit unit disposed opposite to said touch control region at a rear side of said plate; and
    a switching unit provided on a rear side of each of said resilient arms and electrically connected to said control circuit unit, said switching unit having a movable contact member projecting resiliently from said rear side of the corresponding one of said resilient arms, wherein said plate includes a first pair of slit sections formed outwardly of said touch control region and respectively extending along said resilient arms, and a second pair of slit sections extending along said resilient arms and opposite to said first pair of slit sections, each of said resilient arms extending between one of said first pair of slit sections and one of said second pair of slit sections.

2. The touch pad module as claimed in claim 1, wherein said plate has at least four peripheral sides, said slit means including a first slit section opening at one of said peripheral sides and extending inward from said one of said peripheral sides, and a pair of second slit sections which extend in opposite directions from said first slit section parallel to said one of said peripheral sides and which then turn in directions parallel to the other two of said peripheral sides, that are connected to said one of said peripheral sides.

3. The touch pad module as claimed in claim 1, wherein said plate has at least four peripheral sides, said slit means including a first slit section opening at one of said peripheral sides and extending inward from said one of said peripheral sides, and at least a pair of second slit sections extending in opposite directions from said first slit section parallel to said one of said peripheral sides.

4. The touch pad module as claimed in claim 1, wherein said plate has at least four peripheral sides, said slit means including two parallel first slit sections both of which open at one of said peripheral sides and both of which extend adjacent and along the other two of said peripheral sides that are connected to said one side of said peripheral sides.

* * * * *